R. D. EAGLESFIELD.
MOLDING MACHINE.
APPLICATION FILED APR. 24, 1919.

1,407,520.

Patented Feb. 21, 1922.
3 SHEETS—SHEET 2.

INVENTOR.
Robert D. Eaglesfield
BY
Carey S. Frye
ATTORNEY.

R. D. EAGLESFIELD.
MOLDING MACHINE.
APPLICATION FILED APR. 24, 1919.

1,407,520.

Patented Feb. 21, 1922.
3 SHEETS—SHEET 3.

INVENTOR.
Robert D. Eaglesfield

BY
Carey S. Frye
ATTORNEY.

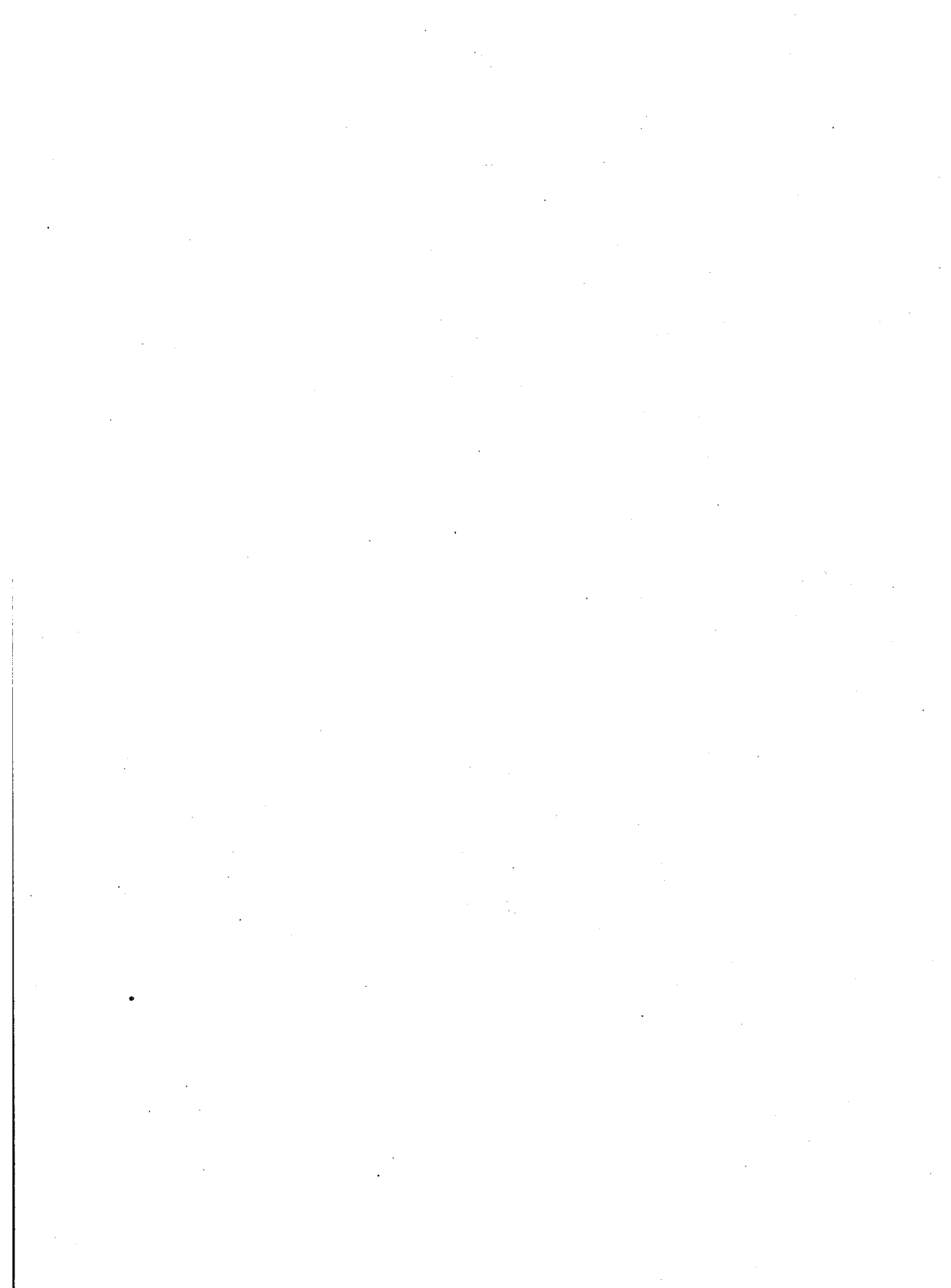

UNITED STATES PATENT OFFICE.

ROBERT D. EAGLESFIELD, OF INDIANAPOLIS, INDIANA, ASSIGNOR TO ANTON VONNEGUT, OF INDIANAPOLIS, INDIANA.

MOLDING MACHINE.

1,407,520.　　　　Specification of Letters Patent.　　Patented Feb. 21, 1922.

Application filed April 24, 1919. Serial No. 292,371.

*To all whom it may concern:*

Be it known that I, ROBERT D. EAGLESFIELD, a citizen of the United States, residing at Indianapolis, county of Marion, and State of Indiana, have invented certain new and useful Improvements in Molding Machines; and I do hereby declare the following to be a full, clear, and exact description of the invention, such as will enable others skilled in the art to which it appertains to make and use the same.

This invention relates to molding machines and is an improvement over my former patent issued April 30th, 1918, No. 1,264,165, and the prime feature of this invention is in the provision of means for adjusting the shafts carrying the cutting members longitudinally without affecting or changing any of the co-operating parts of the individual motors employed for operating said cutting members.

A further feature of the invention, in addition to providing individual motors for the various cutting devices and placing certain of them vertically and others horizontally, for cutting all four sides of a timber while passing once through the machine, is the individual adjusting means for the shaft of each cutting device, whereby one shaft may be adjusted without affecting the other shafts and cutters.

A further feature of the invention is the provision of means for bodily adjusting the various cutting devices and the individual motors employed for operating the same for properly positioning them upon the molding machine frame.

A further feature of the invention is in so arranging the adjustment for the shafts of the cutting devices that the rotors and stators of the motors will in no way be affected or moved by such adjustments.

Other objects and advantages will be hereinafter more fully set forth and pointed out in the accompanying specification.

In the accompanying drawings, which are made a part of this application—

Figure 1:
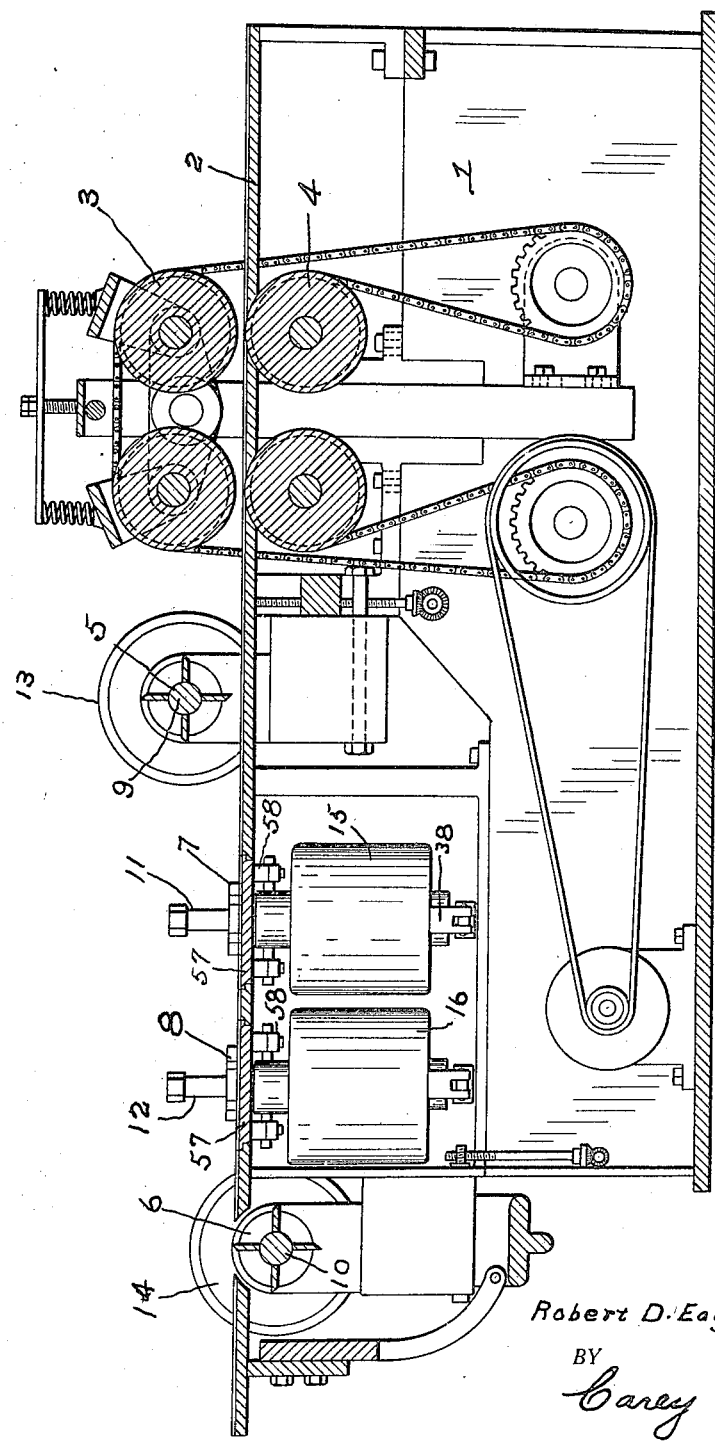

Figure 1 is a vertical longitudinal sectional view through the molding machine, showing the vertical cutting devices in side elevation.

Figure 2:
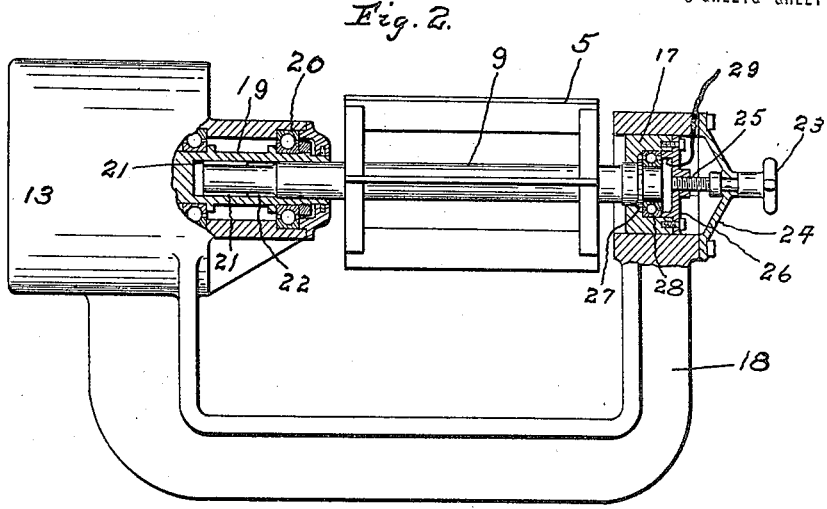

Fig. 2. is an elevation partly in section of one of the horizontal cutting devices.

Figure 3:
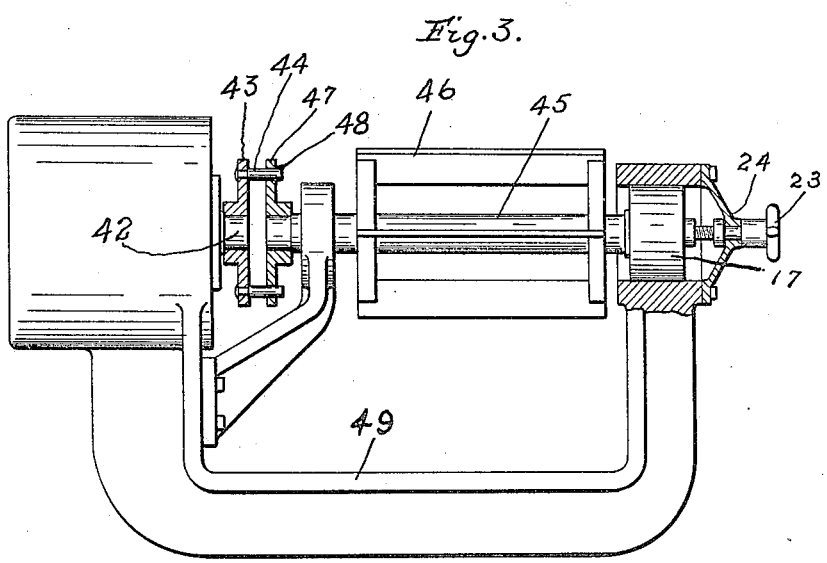

Fig. 3. is a similar view of a slightly different form of structure.

Figure 4:
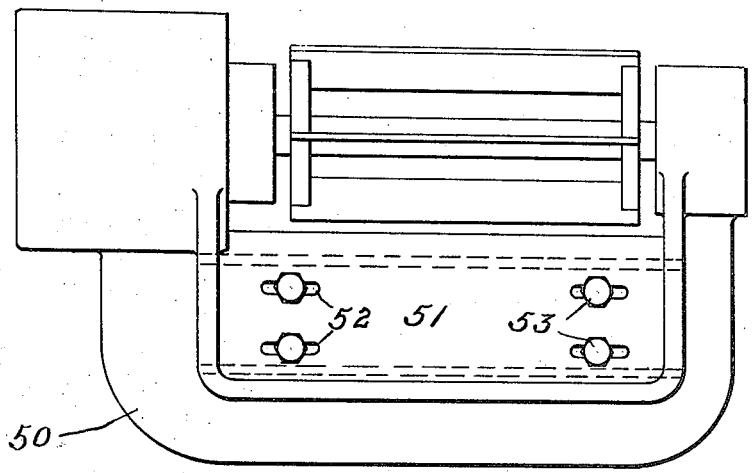

Fig. 4. is a similar view showing means for bodily adjusting the cutting device and motor for driving the same.

Figure 5:
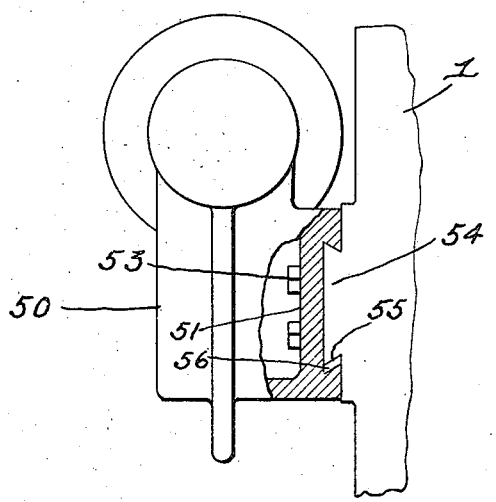

Fig. 5. is an end elevation of that form of structure shown in Fig. 4, partly in section.

Figure 6:
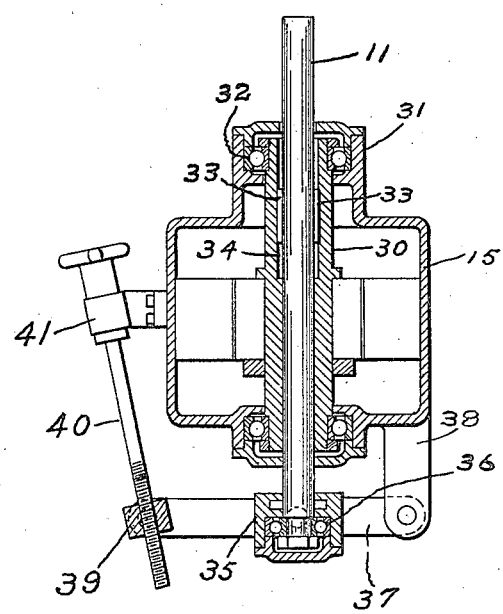

Fig. 6, is a central vertical sectional view of one of the vertically arranged cutting devices.

Referring to the drawings in which similar reference numerals designate corresponding parts throughout the several views, 1 indicates the frame of a molding machine and 2 the bed plate thereof, said parts being constructed in the usual or any preferred manner.

Mounted adjacent one end of the frame 1 are pairs of rolls 3 and 4 between which timbers are fed and by means of which the timbers are moved lengthwise over the bed plate 2, said rolls being operated in any suitable manner, but as they form no part of the present invention, it is not deemed necessary to further describe the same.

This invention is designed to cut all four sides of the timber as it passes once over the bed plate and to accomplish this result, a pair of horizontally disposed cutter heads 5 and 6 are provided, one above the bed plate and the other below the bed plate, which operate respectively upon the upper and lower faces of the timber, and a pair of vertically arranged cutter heads 7 and 8, which are arranged on opposite sides of the path of the timber for trimming the edges of the timber.

The cutter heads 5, 6, 7, and 8 are mounted upon shafts 9, 10, 11 and 12, respectively, said shafts being driven by individual motors 13, 14, 15 and 16, respectively, and as it is necessary at times to adjust said cutter heads with respect to the passing timber, the shafts are arranged to have longitudinal movement with respect to the motors and at the same time drive the cutter heads.

In the form of device shown in Fig. 2, the shaft 9 is mounted at one end in a ball bearing housing 17, which is in turn slidably mounted in one arm of a yoke 18, while the opposite end of said shaft is mounted in a hollow sleeve 19, which in turn carries the rotor (not shown) of the motor 13. This sleeve is in turn mounted in the frame of the motor 13 carried by the opposite arm of the yoke 18.

The sleeve 19, which is driven by the motor, in turn drives the shaft 9 and the cutter head 5 fixed thereto, and this sleeve